(12) United States Patent
Wu (10) Patent No.: US 8,745,873 B2
(45) Date of Patent: Jun. 10, 2014

(54) METHOD FOR MANUFACTURING THE SLIDER OF A LINEAR SLIDING RAIL

(76) Inventor: Lei-Jui Wu, Chang Hua Hsien (TW)

( * ) Notice: Subject to any disclaimer, the term of this patent is extended or adjusted under 35 U.S.C. 154(b) by 494 days.

(21) Appl. No.: 13/085,958

(22) Filed: Apr. 13, 2011

(65) Prior Publication Data
US 2012/0260504 A1    Oct. 18, 2012

(51) Int. Cl.
*B21D 53/10*    (2006.01)

(52) U.S. Cl.
USPC ........... 29/898.03; 384/7; 164/344; 349/66.1; 349/67

(58) Field of Classification Search
CPC .... B22C 9/06; B22C 33/442; B22C 45/4005; B22C 45/44; F16C 29/00; F16C 29/02; F16C 29/005; F16C 33/64; F25C 1/24
USPC ........ 29/898.03, 898; 384/7, 13, 45; 164/271, 164/344; 249/66.1, 67, 68
See application file for complete search history.

(56) References Cited

U.S. PATENT DOCUMENTS 5,295,748 A * 3/1994 Yamazaki .................... 384/45
5,373,635 A * 12/1994 Nonaka et al. ............... 29/898.1
5,431,498 A * 7/1995 Lyon ............................... 384/45
5,800,065 A * 9/1998 Lyon ............................... 384/45
6,174,086 B1 * 1/2001 Ng et al. ......................... 384/45
6,520,681 B2 * 2/2003 Ishihara ......................... 384/45

* cited by examiner

*Primary Examiner* — Daivd Bryant
*Assistant Examiner* — Ryan J Walters
(74) *Attorney, Agent, or Firm* — Jackson IPG PLLC (57) ABSTRACT

An improved method for manufacturing the slider of a linear sliding rail includes employing a forged one-piece billet of the slider, providing an inner forming mold inwardly made into the actual shape of the slider to be molded, utilizing metal rigidity and extensibility of the billet, placing the billet onto the inner forming mold, employing a punching machine to axially drive the billet into the inner mold with the actual shape of the slider, subjecting the billet in the inner forming mold to a powerful press, extending and molding the billet according to the lines and the rail shapes of the slider, further providing an inner shaping mold located in a shaping mold, whose shape is the same as that of the above molded slider but whose size is slightly smaller than that of the molded slider, then driving the molded slider into the inner shaping mold by the punching machine and ejected it from the lower end of the inner shaping mold to complete a finished slider with a completely smooth surface, in order to achieve the effect of reduction in processing steps and rapid molding as well as reduce the loss due to waste.

4 Claims, 10 Drawing Sheets

METHOD FOR MANUFACTURING THE SLIDER OF A LINEAR SLIDING RAIL

BACKGROUND OF THE INVENTION (a) Field of the Invention

The present invention relates to the technical field of an improved method for manufacturing the slider of a linear sliding rail, which employs a forged one-piece billet of the slider, and provides an inner mold located in a mold, inwardly made into the actual shape of the slider to be molded, and utilizes metal rigidity and extensibility of the billet, directly driving the billet into the inner mold with the actual shape of the slider located in the mold by press machining so as to form a molded slider, and further provides a shaping mold, whose shape is the same as that of the above molded slider but whose size is slightly smaller than that of the molded slider, employing the inner shaping mold located in the shaping mold to place the molded slider onto the inner shaping mold, then driving the molded slider into the inner shaping mold by press machining and ejecting the molded slider from the lower end of the inner shaping mold to complete a finished slider with a completely smooth surface, followed by drilling holes, in order to achieve the effect of reduction in processing steps and rapid molding as well as reduce the loss due to waste.

(b) Description of the Prior Art

At the present day, the method for manufacturing a slider first employs a forged and molded single billet with a suitable length, forming the surface and the ridges of the billet by a cutter, and employing a hob to form the inwardly concave rails on the both sides of the slider so as to form a complete slider.

SUMMARY OF THE INVENTION

1. The Problem to be Solved (1) The above manufacturing process is multifarious and needs to form the shape on each ridge, thus resulting in low manufacturing speed and accuracy deviation due to the complicated machining process.

(2) The thickness of the forged and molded billet of the slider must be increased to reserve the required excess thickness for the forming surface and edge lines. This would raise the cost of materials and cause waste of metal scrap during machining, such that the total cost loss of a formed slider would be increased.

2. Means to Solve the Problem (1) The method of the present invention employs a forged one-piece billet of the slider, and provides a forming mold inwardly made into the actual shape of the slider to be molded, and utilizes metal rigidity and extensibility of the billet, directly placing the billet onto the inner forming mold with the actual shape of the slider located in the forming mold, employing a punching machine to axially drive the billet of the slider into the inner forming mold with the actual shape of the slider, subjecting the billet in the inner forming mold of the actual slider to a powerful press, extending and molding the billet according to the lines and the rail shapes, then ejecting the molded slider from the bottom of the inner mold located in the mold, and further provides an inner shaping mold located in a shaping mold, whose shape is the same as that of the above molded slider but whose size is slightly smaller than that of the molded slider, placing the molded slider onto the inner shaping mold, then driving the molded slider into the inner shaping mold by the punching machine and ejecting the molded slider from the lower end of the inner shaping mold to complete a finished slider with a completely smooth surface, followed by drilling holes, in order to achieve the effect of reduction in processing steps and rapid molding as well as reduce the loss due to waste.

(2) In accordance with the foregoing molding steps, the method of the present invention forges and molds a billet of the slider; placing the billet of the slider onto an inner mold with the actual shape of the slider located in a mold; forming the billet of the slider into a molded slider by press machining; and further employs an inner shaping mold located in a shaping mold, driving the molded slider into the inner shaping mold by press machining, then pressing and shaping the molded slider to obtain a finished slider with a smooth surface; drilling holes to obtain a processed slider, which could accelerate the processing as well as save material and machining.

(3) The shape of the inner shaping mold employed in the shaping mold according to the present invention is equal to that of the molded slider, and the size of the inner shaping mold is slightly smaller than that of the molded slider by less than about 1 mm, such that the molded slider would generate extensibility when passing through the inner shaping mold to achieve the effect of shaping the finished slider and pressing the surface thereof to form a smooth surface.

(4) The shape of the inner forming mold located in the forming mold according to the present invention could be made according to that of the molded slider so as to manufacture the sliders of linear sliding rails of various shapes correspondingly.

DETAILED DESCRIPTION OF THE PREFERRED EMBODIMENTS

Since the shape of the slider depends on the required shape and action for a linear sliding rail, in order to easily understand the present invention, the most typical method for manufacturing the slider will be described below.

Figure 1:
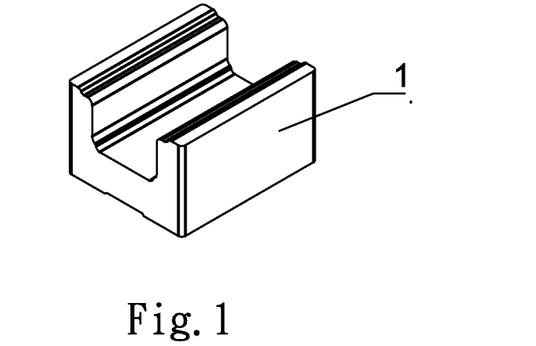
FIG. 1 is a three dimensional view of a forged and molded billet according to a first embodiment of the present invention.
Figure 1A:
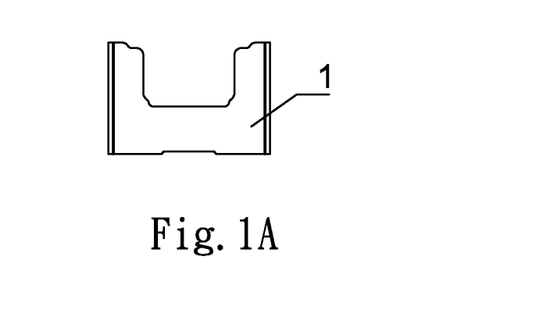
FIG. 1A is a front view of a forged and molded billet according to a first embodiment of the present invention.
Figure 2:
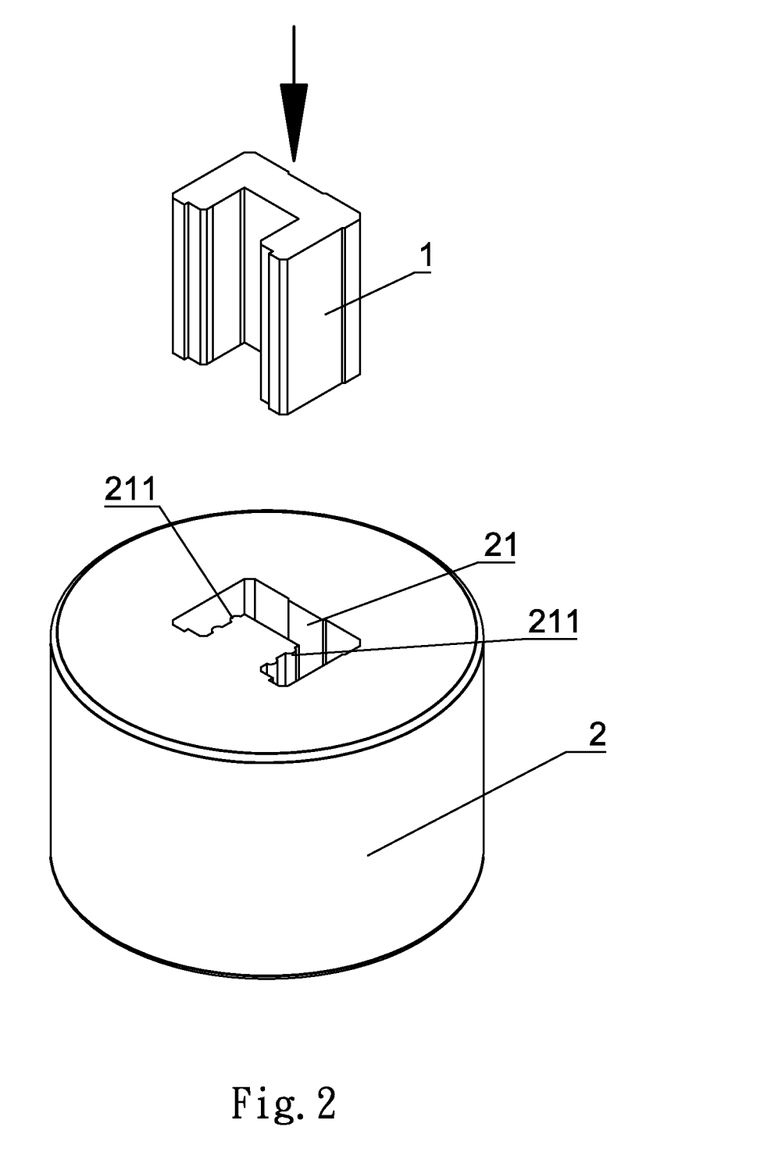
FIG. 2 is a schematic view showing the first step according to a first embodiment of the present invention.
Figure 3:
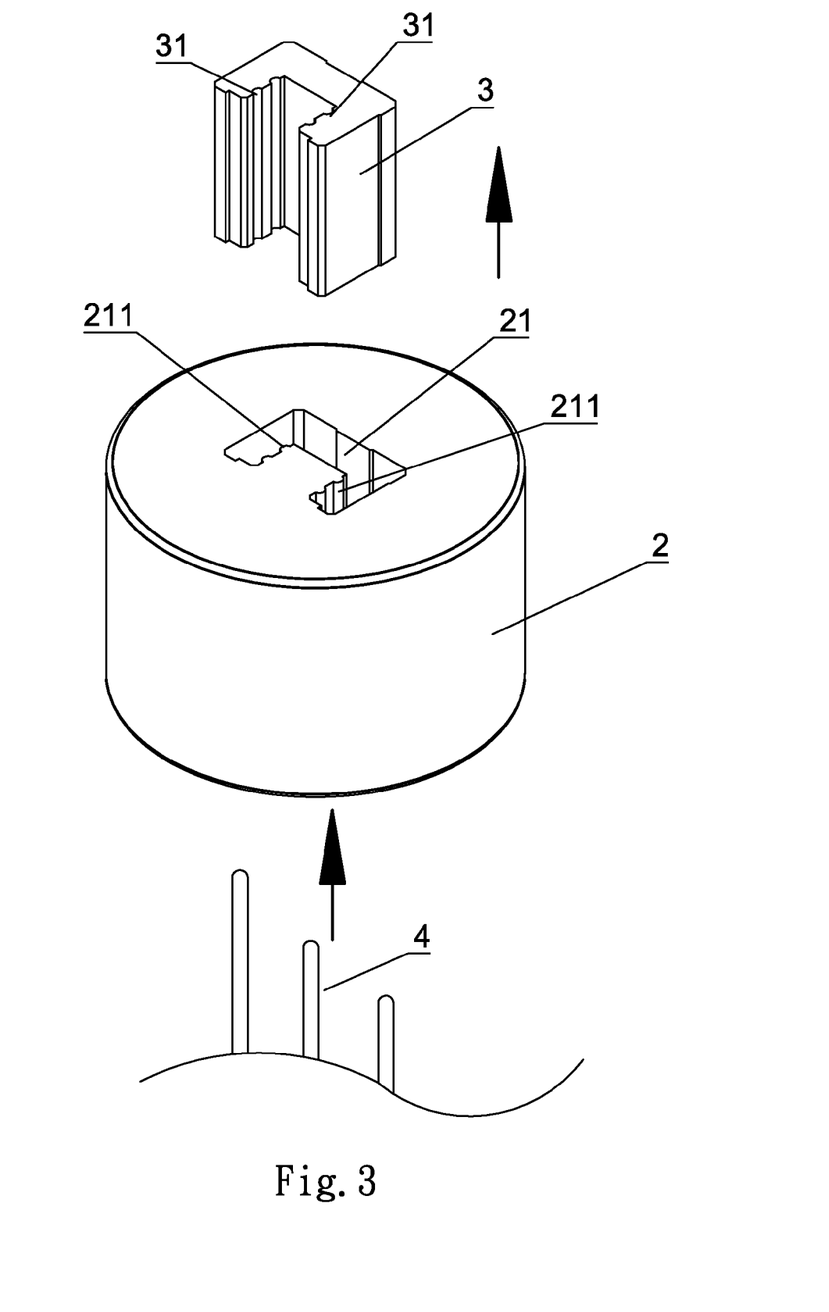
FIG. 3 is a schematic view showing the second step according to a first embodiment of the present invention.
Figure 4:
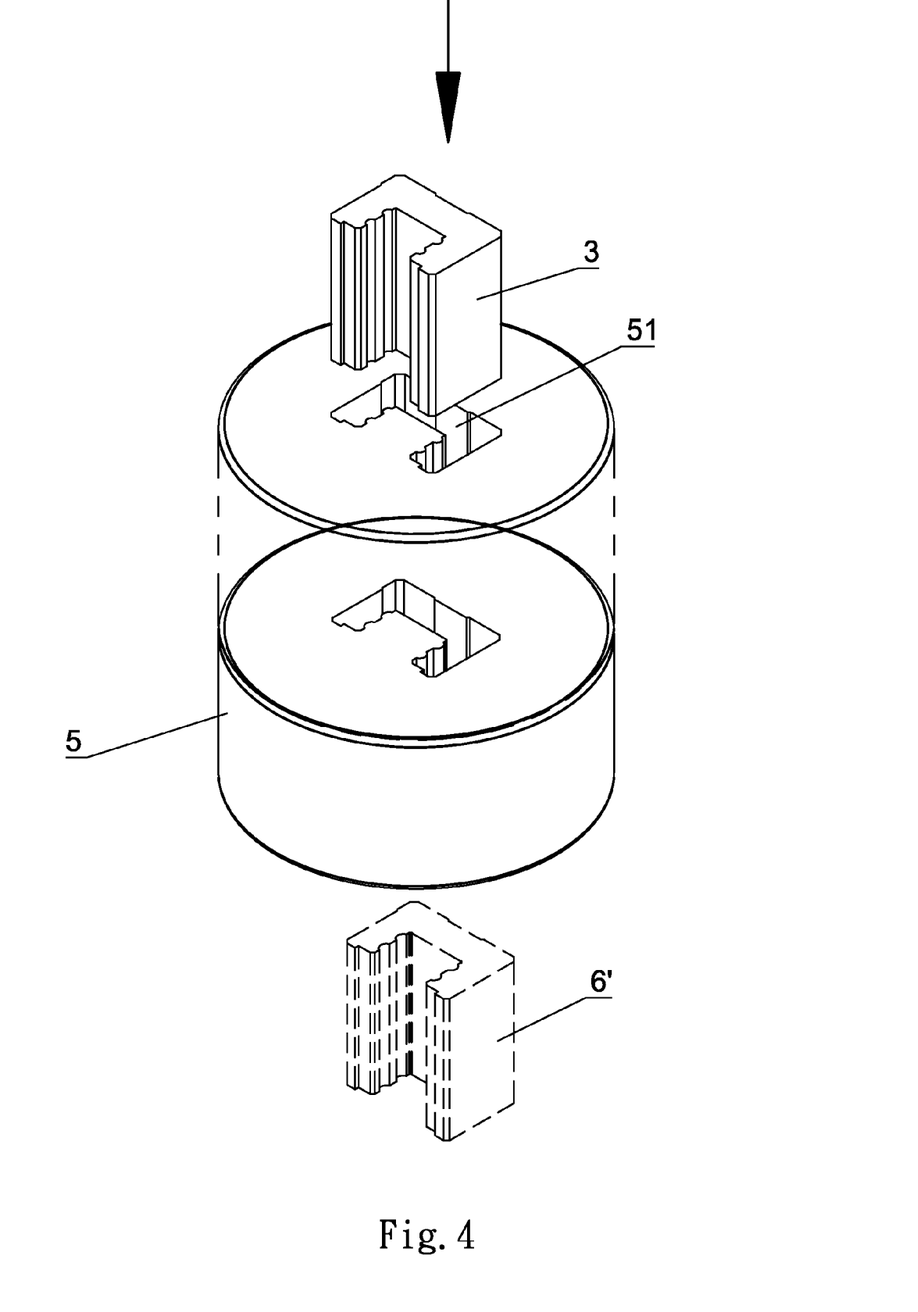
FIG. 4 is a schematic view showing the third step according to a first embodiment of the present invention.
Figure 5:
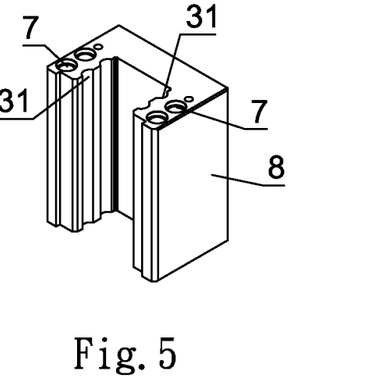
FIG. 5 is a schematic view of the entity of a finished slider according to a first embodiment of the present invention.
Figure 5A:
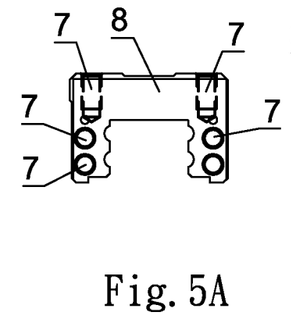
FIG. 5A is a front perspective view of the entity of a finished slider according to a first embodiment of the present invention.
Figure 6:
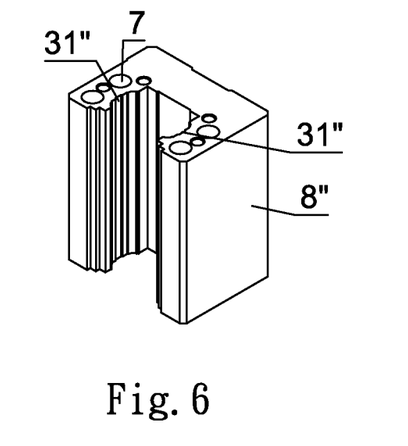
FIG. 6 is a three dimensional view of a body molded with a different sliding rail according to a first embodiment of the present invention.
Figure 6A:
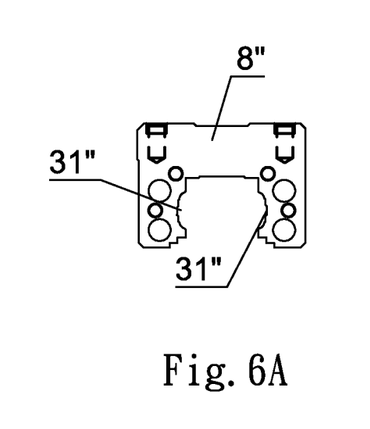
FIG. 6A is a front perspective view of FIG. 6.
Figure 7:
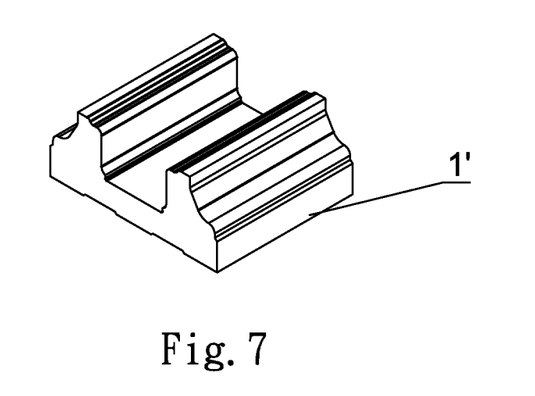
FIG. 7 is a three dimensional view of a forged and molded billet according to a second embodiment of the present invention.
Figure 7A:
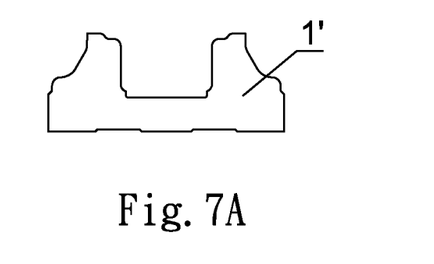
FIG. 7A is a front view of a forged and molded billet according to a second embodiment of the present invention.
Figure 8:
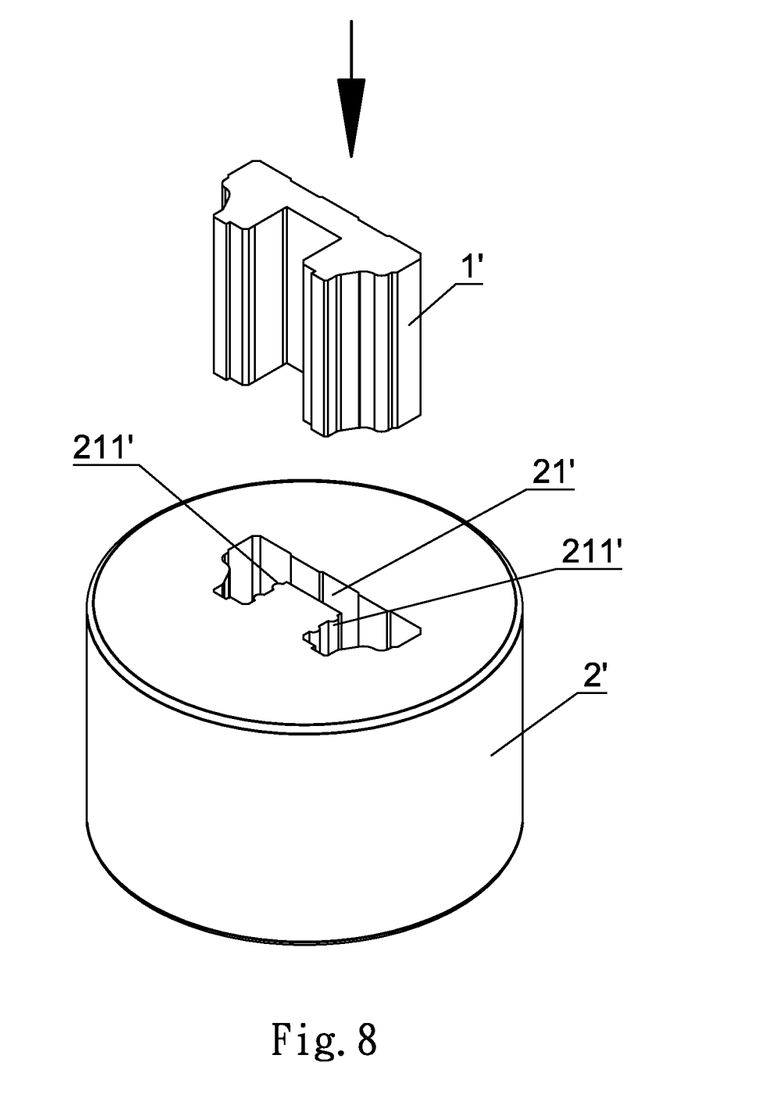
FIG. 8 is a schematic view showing the first step according to a second embodiment of the present invention.
Figure 9:
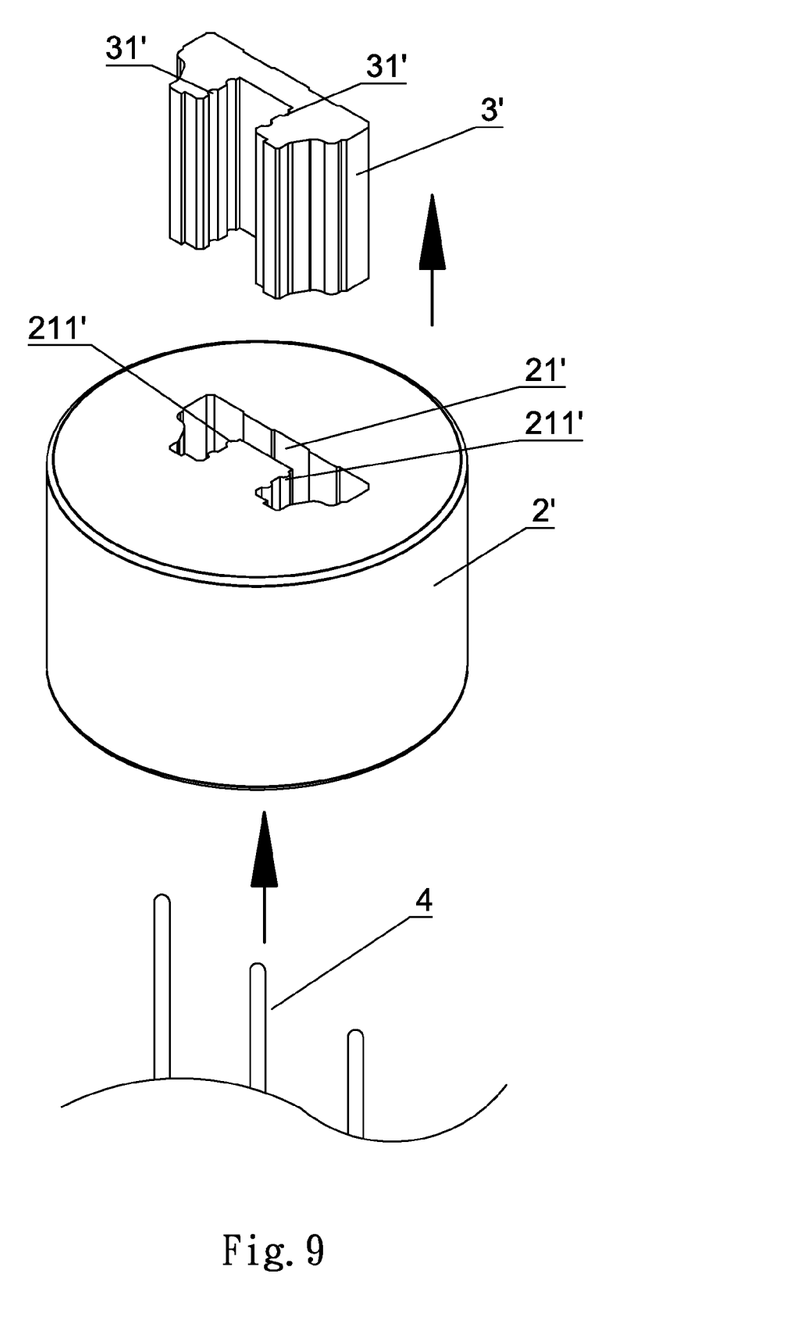
FIG. 9 is a schematic view showing the second step according to a second embodiment of the present invention.
Figure 10:
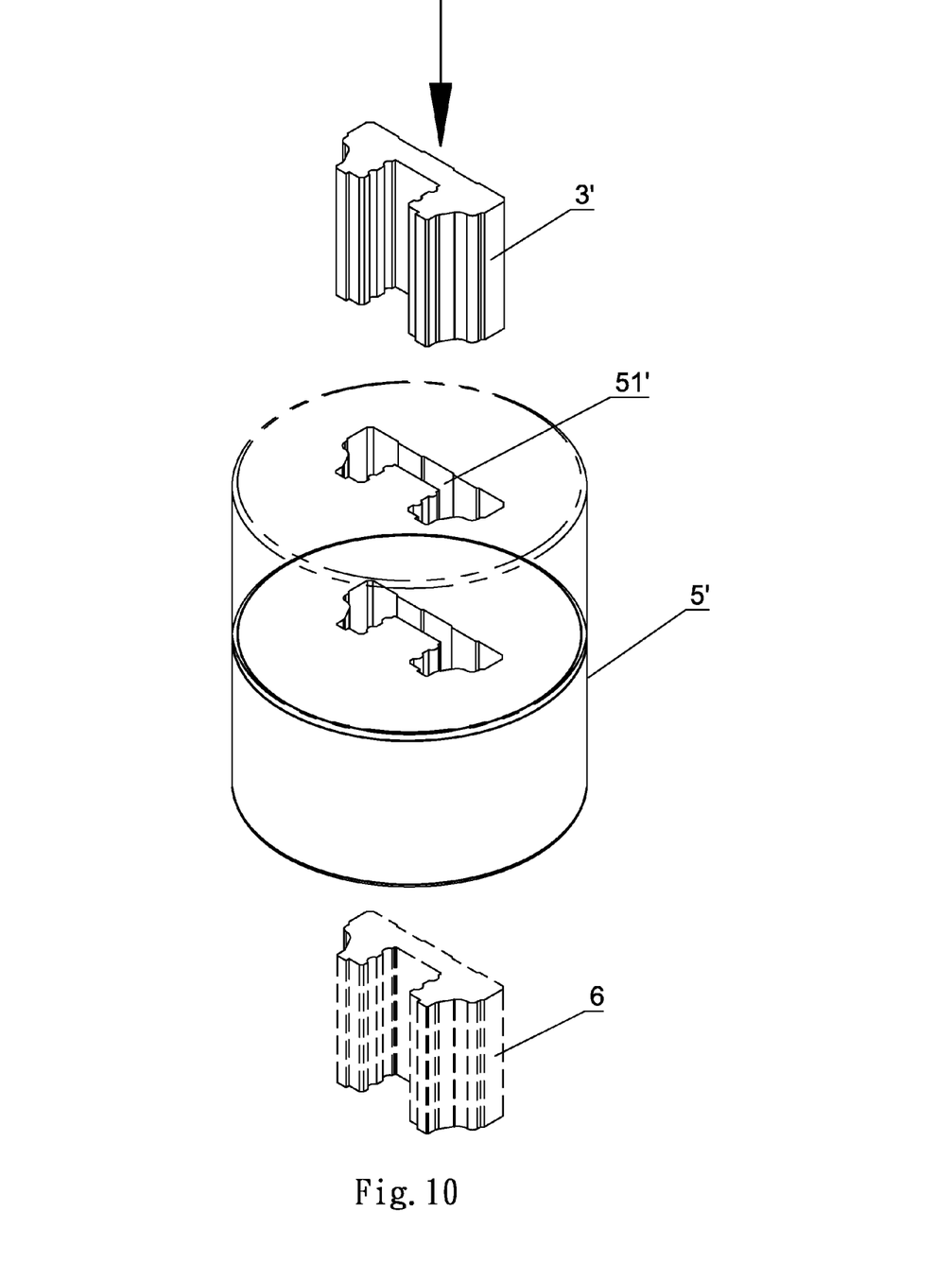
FIG. 10 is a schematic view showing the third step according to a second embodiment of the present invention.
Figure 11:
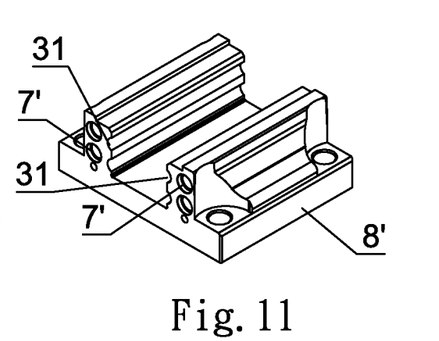
FIG. 11 is a schematic view of the entity of a finished slider according to a second embodiment of the present invention.
Figure 11A:
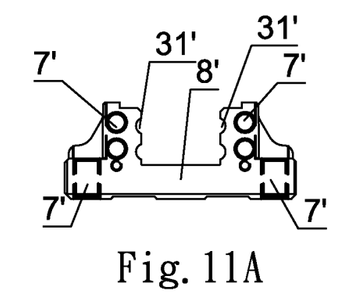
FIG. 11A is a front perspective view of the entity of a finished slider according to a second embodiment of the present invention.
Figure 12:
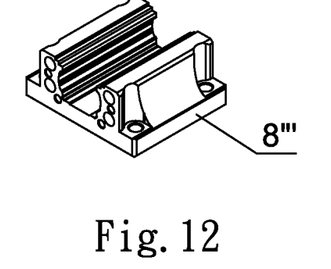
FIG. 12 is a three dimensional view of a body molded with a different sliding rail according to a second embodiment of the present invention.
Figure 12A:
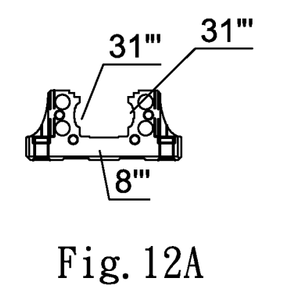
FIG. 12A is a front perspective view of FIG. 12 according to the present invention.

Referring to FIGS. 1 to 12, the method of the present invention employs forged one-piece billets 1, 1' of the sliders (as shown in FIGS. 1, 7, and FIGS. 1A, 7A), and provides forming molds 2, 2' (as shown in FIGS. 2 and 8) inwardly made into the actual shapes of the sliders to be molded, and utilizes metal rigidity and extensibility of the billets 1, 1' of the sliders, directly placing the billets 1, 1' of the sliders onto the inner forming molds 21, 21' with the actual shapes of the sliders located in the forming molds 2, 2', employing a punching machine to axially drive the billets 1, 1' of the sliders into the inner forming molds 21, 21' with the actual shapes of the sliders, subjecting the billets 1, 1' of the sliders in the inner forming molds 21, 21' of the actual sliders to a powerful press, extending and molded by the lines and the rails 211, 211' of the inner forming molds 21, 21' according to the lines and the rail shapes 31, 31' of the molded sliders 3, 3', then ejecting the molded sliders 3, 3' from the bottoms of the inner forming molds 21, 21' located in the forming molds 2, 2' by a push rod 4 (as shown in FIGS. 3 and 9), and further provides inner shaping molds 51, 51' located in shaping molds 5, 5', whose shapes are the same as those of the above molded sliders 3, 3' but whose sizes are slightly smaller than those of the molded sliders 3, 3' (as shown in FIGS. 4 and 10), placing the molded sliders 3, 3' onto the inner shaping molds 51, 51', then driving the molded sliders 3, 3' into the inner shaping molds 51, 51' by the punching machine and ejecting the molded sliders 3, 3' from the lower ends of the inner shaping molds 51, 51' to complete finished sliders 6, 6' with completely smooth surfaces, and followed by drilling holes 7, 7' then completing entities 8, 8' of the sliders (as shown in FIGS. 5 and 11), in order to achieve the effect of reduction in processing steps and rapid molding as well as reduce the loss due to waste.

In accordance with the foregoing molding steps, the method of the present invention forges and molds billets 1, 1' of the sliders (as shown in FIGS. 1, 7, and FIGS. 1A, 7A); placing the billets 1, 1' of the sliders onto the inner forming molds 21, 21' with the actual shapes of the sliders located in the forming molds 2, 2' (as shown in FIGS. 2 and 8); forming the billets 1, 1' of the sliders into molded sliders 3, 3' by press machining (as shown in FIGS. 3 and 9); and further employs inner shaping molds 51, 51' located in shaping molds 5, 5', driving the molded sliders 3, 3' into the inner shaping molds 51, 51' by press machining, then pressing and shaping the molded sliders 3, 3' to obtain finished sliders 6, 6' with completely smooth surfaces (as shown in FIGS. 4 and 10); and drilling holes 7, 7' to obtain processed entities 8, 8' of the sliders (as shown in FIGS. 5 and 11), which could accelerate the processing as well as save material and machining.

Referring to FIGS. 4 and 10, the shapes of the inner shaping molds 51, 51' employed in the shaping molds 5, 5' according to the present invention are equal to those of the molded sliders 3, 3', and the sizes of the inner shaping molds 51, 51' are slightly smaller than those of the molded sliders 3, 3' by less than about 1 mm, such that the molded sliders 3, 3' would generate extensibility when passing through the inner shaping mold 51, 51' to achieve the effect of shaping the finished sliders 6, 6' and pressing the surfaces thereof to form smooth surfaces.

Referring to FIGS. 6, 12, and FIGS. 6A, 12A, the shapes of the inner forming molds 21, 21' located in the forming mold 2, 2' could be made according to the lines and the rail shapes 31", 31'" of the molded sliders 3, 3' so as to manufacture entities 8", 8'" of the sliders of linear sliding rails of various shapes correspondingly.

In view of the above, we conclude that it requires no surface finishing and could mold rapidly without the waste from machining operations, furthermore, it could achieve the benefit of rapid production and cost reduction by utilizing metal rigidity and extensibility to mold the sliders directly according to the present invention. The examples and drawings has been described above are the preferred embodiments of the present invention only, it is not intended to limit the scope of the present invention, hence all similar or equivalent changes and modifications made according to the claims and specification fall within the scope of the claims.

What is claimed is:

1. An improved method for manufacturing the slider of a linear sliding rail, the steps for manufacturing the slider comprising:
    a. employing a forged one-piece billet of the slider;
    b. placing the billet of the slider onto an inner forming mold with the actual shape of the slider to be molded located in a forming mold;
    c. utilizing metal rigidity and extensibility of the billet of the slider, axially driving the billet of the slider into the inner forming mold with the actual shape of the slider by a punching machine;
    d. subjecting the billet of the slider in the inner forming mold of the actual slider to a powerful press, the billet extending and molded by the lines and the rails of the inner forming mold according to the lines and the rail shapes of the molded slider;
    e. then ejecting the molded slider by a push rod;
    f. further providing an inner shaping mold located in a shaping mold, whose shape is the same as that of the above molded slider but whose size is slightly smaller than that of the molded slider, placing the molded slider onto the inner shaping mold; and
    g. driving the molded slider into the inner shaping mold by the punching machine and ejecting the molded slider from the lower end of the inner shaping mold to complete a finished slider with a completely smooth surface.

2. The improved method for manufacturing the slider of a linear sliding rail as described in claim 1, wherein the shape of the inner shaping mold employed in the shaping mold is equal to that of the molded slider, and the size of the inner shaping mold is slightly smaller than that of the molded slider by less than about 1 mm, such that the molded slider would generate extensibility when passing through the inner shaping mold to shape the finished slider and press the surface thereof to form a smooth surface.

3. The improved method for manufacturing the slider of a linear sliding rail as described in claim 1, wherein the shape of the inner forming mold located in the forming mold is made according to that of the molded slider so as to manufacture the sliders of linear sliding rails of various shapes correspondingly.

4. The improved method for manufacturing the slider of a linear sliding rail as described in claim 1, wherein a plurality of push rods are disposed at the bottom of the forming mold and eject the molded slider from the inner forming mold.

* * * * *